(12) United States Patent
Sano

(10) Patent No.: US 9,039,939 B2
(45) Date of Patent: May 26, 2015

(54) PRODUCTION METHOD OF ACTIVE MATERIAL, AND ACTIVE MATERIAL

(75) Inventor: Atsushi Sano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 12/052,207

(22) Filed: Mar. 20, 2008

(65) Prior Publication Data

US 2008/0237536 A1    Oct. 2, 2008

(30) Foreign Application Priority Data

Mar. 29, 2007   (JP) .................................. 2007-088014

(51) Int. Cl.
| | |
|---|---|
| H01B 1/06 | (2006.01) |
| H01B 1/24 | (2006.01) |
| H01M 4/38 | (2006.01) |
| H01M 4/13 | (2010.01) |
| H01M 4/139 | (2010.01) |
| H01M 4/48 | (2010.01) |
| H01M 4/66 | (2006.01) |
| H01M 10/0525 | (2010.01) |

(52) U.S. Cl.
CPC ........ *H01M 4/38* (2013.01); *H01M 4/13* (2013.01); *H01M 4/139* (2013.01); *H01M 4/483* (2013.01); *H01M 4/663* (2013.01); *H01M 10/0525* (2013.01); *Y02E 60/122* (2013.01)

(58) Field of Classification Search
CPC ..... H01M 4/00; B01J 35/1019; B01J 35/1052
USPC .......... 252/500, 521.2, 642, 182.1, 506, 507; 264/14; 423/449.2, 414; 429/44, 220, 429/103, 206, 245, 207, 483, 231.8, 209, 429/221, 223, 232, 218.1; 29/25.03; 438/396; 502/182–185; 361/502; 427/122
See application file for complete search history.

(56) References Cited

U.S. PATENT DOCUMENTS

| | | | | |
|---|---|---|---|---|
| 3,619,428 A | * | 11/1971 | David | .............................. 264/14 |
| 3,969,139 A | * | 7/1976 | Lai | ................................ 429/103 |
| 4,011,374 A | * | 3/1977 | Kaun | ............................ 429/220 |

(Continued)

FOREIGN PATENT DOCUMENTS

| | | |
|---|---|---|
| CN | 1505198 A | 6/2004 |
| CN | 1574428 A | 2/2005 |

(Continued)

OTHER PUBLICATIONS

English Translation of Chinese Office Action dated Jan. 26, 2011 in Chinese Patent Application No. 200810088541.9.

(Continued)

*Primary Examiner* — Khanh Tuan Nguyen
(74) *Attorney, Agent, or Firm* — Oliff PLC

(57) ABSTRACT

A production method of an active material, and the active material are provided to realize an active material containing metal-containing particles and being capable of achieving satisfactory cycle performance and rate performance. The active material is produced by a method of polymerizing a mixture of a metal ion, a hydroxy acid, and a polyol to obtain a polymer, and a step of carbonizing the polymer. The active material used is one having a carbonaceous porous material, and metal particles and/or metal oxide particles supported in pores of the carbonaceous porous material, and particle diameter of the metal-containing particles are in the range of 10 to 300 nm.

3 Claims, 4 Drawing Sheets

(56) References Cited

U.S. PATENT DOCUMENTS

| | | | | |
|---|---|---|---|---|
| 4,052,336 A | * | 10/1977 | van Montfoort et al. | 502/185 |
| 4,224,392 A | * | 9/1980 | Oswin | 429/206 |
| 4,233,378 A | * | 11/1980 | Joo' et al. | 429/220 |
| 4,482,641 A | * | 11/1984 | Wennerberg | 502/182 |
| 4,569,924 A | * | 2/1986 | Ozin et al. | 502/184 |
| 4,656,153 A | * | 4/1987 | Wennerberg | 502/182 |
| 4,970,189 A | * | 11/1990 | Tachibana | 502/183 |
| 5,462,821 A | * | 10/1995 | Onoue et al. | 429/218.1 |
| 5,938,837 A | * | 8/1999 | Hanawa et al. | 117/68 |
| 6,335,002 B1 | * | 1/2002 | Kogoi et al. | 424/63 |
| 7,083,876 B2 | * | 8/2006 | Honbo et al. | 429/209 |
| 7,517,606 B2 | * | 4/2009 | Kodas et al. | 429/483 |
| 7,618,747 B2 | | 11/2009 | Audemer et al. | |
| 7,710,073 B2 | * | 5/2010 | Yamauchi et al. | 320/128 |
| 7,923,154 B2 | | 4/2011 | Audemer et al. | |
| 2001/0020319 A1 | * | 9/2001 | Farahmandi et al. | 29/25.03 |
| 2002/0126439 A1 | * | 9/2002 | Sato et al. | 361/502 |
| 2003/0086860 A1 | * | 5/2003 | Uehara et al. | 423/449.2 |
| 2003/0118897 A1 | | 6/2003 | Mino et al. | |
| 2004/0004208 A1 | * | 1/2004 | Sakata et al. | 252/500 |
| 2004/0047798 A1 | * | 3/2004 | Oh et al. | 423/414 |
| 2004/0106046 A1 | | 6/2004 | Inda | |
| 2004/0191632 A1 | | 9/2004 | Kelley et al. | |
| 2004/0234859 A1 | | 11/2004 | Lee et al. | |
| 2005/0019649 A1 | | 1/2005 | Kakutani et al. | |
| 2005/0181268 A1 | * | 8/2005 | Ohya et al. | 429/44 |
| 2006/0024583 A1 | * | 2/2006 | Singh et al. | 429/245 |
| 2006/0105242 A1 | | 5/2006 | Sato et al. | |
| 2006/0140846 A1 | * | 6/2006 | Leis et al. | 423/445 R |
| 2006/0228631 A1 | | 10/2006 | Miura et al. | |
| 2006/0234130 A1 | | 10/2006 | Inda | |
| 2007/0015336 A1 | * | 1/2007 | Farahmandi et al. | 438/396 |
| 2008/0241665 A1 | | 10/2008 | Sano | |
| 2008/0311480 A1 | | 12/2008 | Sano | |
| 2009/0061312 A1 | | 3/2009 | Zhamu et al. | |
| 2009/0274832 A1 | | 11/2009 | Inda | |
| 2011/0212365 A1 | | 9/2011 | Audemer et al. | |

FOREIGN PATENT DOCUMENTS

| | | | | |
|---|---|---|---|---|
| CN | 1613162 A | | 5/2005 | |
| JP | 04-310512 | * | 11/1992 | C01B 31/36 |
| JP | A-05-299101 | | 11/1993 | |
| JP | 10-297912 | * | 11/1998 | C01B 31/08 |
| JP | A 11-054155 | | 2/1999 | |
| JP | A-11-185733 | | 7/1999 | |
| JP | A-11-214034 | | 8/1999 | |
| JP | A-2000-138073 | | 5/2000 | |
| JP | A 2001-23616 | | 1/2001 | |
| JP | A-2001-126758 | | 5/2001 | |
| JP | A-2001-143697 | | 5/2001 | |
| JP | A 2001-332254 | | 11/2001 | |
| JP | A 2002-270170 | | 9/2002 | |
| JP | A-2003-187876 | | 7/2003 | |
| JP | 2004175660 | * | 6/2004 | C01B 31/12 |
| JP | A-2004-183078 | | 7/2004 | |
| JP | A 2004-311428 | | 11/2004 | |
| JP | A-2005-530676 | | 10/2005 | |
| JP | 2006-056750 | * | 3/2006 | C01B 31/02 |
| WO | WO 97/31738 A1 | * | 9/1997 | B22F 3/11 |
| WO | WO 2005/076390 A2 | | 8/2005 | |

OTHER PUBLICATIONS

Sep. 1, 2011 Office Action issued in U.S. Appl. No. 12/053,997.
Nov. 14, 2011 Office Action issued in U.S. Appl. No. 12/054,035.
Jun. 29, 2012 Office Action issue in U.S. Appl. No. 12/054,035.
Jun. 21, 2013 Office Action issued in U.S. Appl. No. 12/054,035.
Apr. 12, 2013 Office Action issued in U.S. Appl. No. 12/053,997.
Feb. 27, 2014 Office Action issued in U.S. Appl. No. 12/053,997.
Jan. 27, 2014 Office Action issued in U.S. Appl. No. 12/054,035.
Sep. 17, 2014 Office Action issued in U.S. Appl. No. 12/053,997.

* cited by examiner

Fig.4

| | PRODUCTION METHOD OF METAL-CONTAINING ACTIVE MATERIAL PARTICLES | AVERAGE PRIMARY PARTICLE DIAMETER OF METAL-CONTAINING ACTIVE MATERIAL PARTICLES (nm) | HIGH-RATE/LOW-RATE DISCHARGE CAPACITY RATIO (5C/1C) | CAPACITY MAINTENANCE RATE AFTER 300 CYCLES |
|---|---|---|---|---|
| EXAMPLE 1 | POLYMERIZE MIXTURE OF METAL COMPLEX AND POLYOL AND CARBONIZE THE POLYMER | 200 | 65% | 85 |
| COMPARATIVE EXAMPLE 1 | PULVERIZE METAL POWDER MADE BY ARC MELTING | 4000 | 31% | 12 |
| COMPARATIVE EXAMPLE 2 | MIX RESIN AND METAL COMPLEX AND CARBONIZE THE MIXTURE | 1000 | 45% | 15 |

PRODUCTION METHOD OF ACTIVE MATERIAL, AND ACTIVE MATERIAL

BACKGROUND OF THE INVENTION

1. Field of the Invention

The present invention relates to an active material used for electrochemical devices and others, and a method for producing the active material.

2. Related Background Art

A number of studies have been conducted on metal-containing particles with charge and discharge capacities larger than those of graphite (e.g., metal particles, metal oxide particles, metal sulfide particles, etc.), as anode active materials for the electrochemical devices such as lithium secondary batteries (e.g., Japanese Patent Application Laid-open Nos. 11-54155, 2001-332254, 2001-23616, 2002-270170, and 2004-311428). However, the active materials consisting of the metal-containing particles demonstrate the cycle performance considerably poorer than that of graphite. The cause of this poorer cycle performance is thought to be failure in electric conduction caused as follows: the metal-containing particles expand and constrict to become more finely powdered and the metal-containing particles become released from a current collector to result in failure in electric conduction. With the metal-containing particles, lithium ions often diffuse slow in a solid and it is often the case that the rate performance is insufficient.

The studies are thus directed toward micronization of the metal-containing particles for these reasons. The techniques for implementing the micronization include pulverization with a planetary ball mill, production of nanoparticles by CVD, production of nanoparticles by spray pyrolysis, wet reduction (Japanese Patent Application Laid-open Nos. 11-54155 and 2001-332254), dry reduction (Japanese Patent Application Laid-open No. 2002-270170), spray atomization (Japanese Patent Application Laid-open No. 2004-311428), and so on. There are also attempts to make the metal-containing particles supported in a carbon carrier (Japanese Patent Application Laid-open No. 2001-23616).

SUMMARY OF THE INVENTION

However, the conventional methods had difficulties in achieving satisfactory cycle performance and rate performance.

The present invention has been accomplished in view of the above problem and an object of the invention is to provide a production method of an active material, and an active material containing metal-containing particles and being capable of achieving satisfactory cycle performance and rate performance.

A production method of an active material according to the present invention comprises a step of polymerizing a mixture of a metal ion, a hydroxy acid, and a polyol to obtain a polymer, and a step of carbonizing the polymer.

In the mixture of the metal ion, the hydroxy acid, and the polyol, the hydroxy acid coordinates around the metal ion to form a metal complex, and the metal ion is readily dispersed in the form of the metal complex in the polyol. When the mixture is polymerized by heating or the like to cause dehydrating condensation (esterification) of the COOH group of the hydroxy acid and each OH group of the polyol, an organic network is formed by the polymer of the polyol and the hydroxy acid in a state in which the metal ion is dispersed, whereby the polymer with the metal ion dispersed therein is readily produced. Furthermore, the carbonization of this polymer obtains an active material in which fine metal-containing particles, e.g., with particle diameter of about 10-300 nm are supported in a carbonaceous porous material. Since the particle diameter of the metal-containing particles are sufficiently small in such an active material, diffusion of electrolyte ions is adequately promoted and the finer powdering with thermal expansion and constriction is also suppressed during charge-discharge cycles. Since the metal-containing particles exist in the carbonaceous porous material, the active material exhibits adequate electron conductivity as a whole even with use of metal-containing particles having poor electron conductivity.

The metal ion is preferably an ion of a metal selected from the group consisting of Sn, Si, Al, Ge, Sb, Ag, Ga, In, Fe, Co, Ni, Ti, Mn, Ca, Ba, La, Zr, Ce, Cu, and Zn. The metal ion may comprise ions of two or more metals selected from the group.

The polyol is preferably a glycol.

The glycol is preferably one selected from the group consisting of ethylene glycol, propylene glycol, and diethylene glycol. The glycol may comprise two or more glycols selected from the group.

The hydroxy acid is preferably one selected from the group consisting of citric acid, tartaric acid, citramalic acid, isocitric acid, leucine acid, mevalonic acid, pantoic acid, ricinoleic acid, ricinelaidic acid, and cerebronic acid. The hydroxy acid may comprise two or more hydroxy acids selected from the group.

An active material according to the present invention comprises a carbonaceous porous material, and a metal-containing particle supported in a pore of the carbonaceous porous material, and a particle diameter of the metal-containing particle is in the range of 10 to 300 nm.

This active material is readily produced by the above-described production method. Since the particle diameter of the metal-containing particle is sufficiently small in this active material, the diffusion of electrolyte ions is adequately promoted and the finer powdering with thermal expansion and constriction is also suppressed during charge-discharge cycles. Since the metal-containing particle exists in the carbonaceous porous material, the active material exhibits satisfactory electron conductivity as a whole even with use of metal-containing particles having poor electron conductivity.

Preferably, an aggregate of the metal-containing particle is supported in the pore of the carbonaceous porous material. This sufficiently increases the volume and weight of the metal-containing particle in the active material, while decreasing the primary particle diameter.

The metal-containing particle preferably contains at least one metal selected from the group consisting of Sn, Si, Al, Ge, Sb, Ag, Ga, In, Fe, Co, Ni, Ti, M, Ca, Ba, La, Zr, Ce, Cu, and Zn.

An electrode according to the present invention is an electrode comprising the above-described active material.

An electrochemical device according to the present invention is an electrochemical device comprising the above-described electrode.

The present invention provides the production method of the active material and the active material containing the metal-containing particle and achieving satisfactory cycle performance and rate performance.

BRIEF DESCRIPTION OF THE DRAWINGS

FIG. 4 is a table showing the average primary particle diameter of metal-containing active material particles, rate performance, and cycle performance in Example and Comparative Examples.

Figure 1:
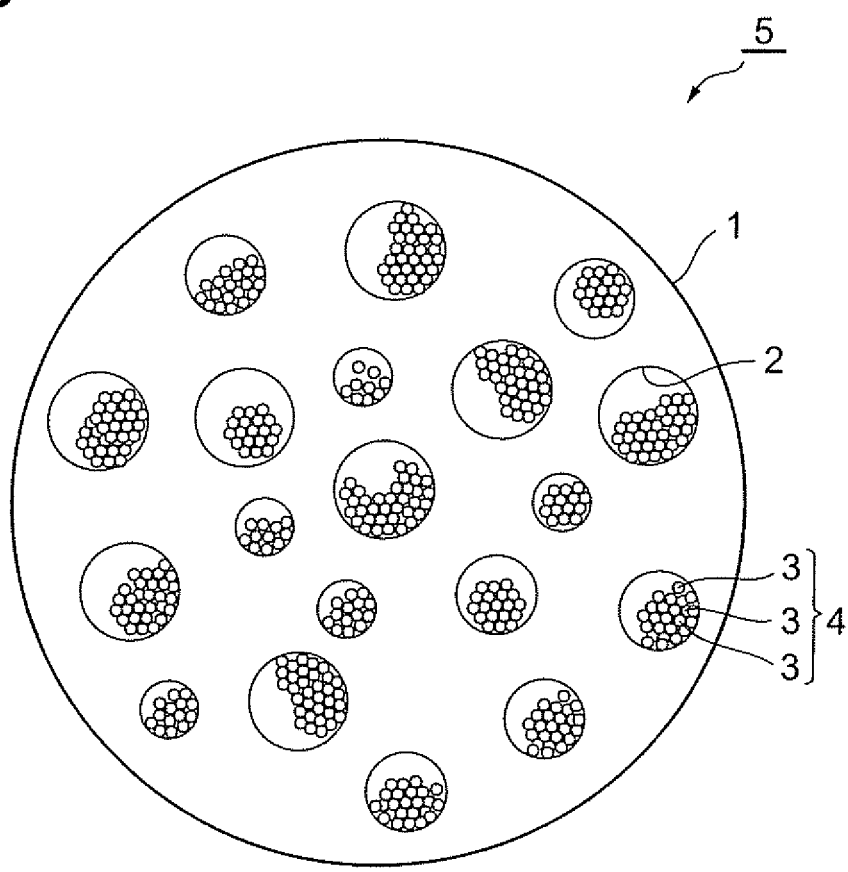
FIG. 1 is a schematic sectional view showing a structure of an anode active material.

1 carbonaceous porous material; 2 pore; 3 metal-containing particles; 4 aggregate; 5 active material; 20 anode (electrode); 100 electrochemical device.

DESCRIPTION OF THE PREFERRED EMBODIMENTS

The preferred embodiments of the present invention will be described below in detail with reference to the accompanying drawings. Identical or equivalent elements will be denoted by the same reference symbols in the description of the drawings, without redundant description. It is also noted that the dimensional ratios in the drawings do not always agree with the actual dimensional ratios.

(Active Material for Anode)

An active material 5 for anode according to the present embodiment is one in which metal-containing particles 3 are supported in pores 2 of a carbonaceous porous material 1.

The carbonaceous porous material 1 has a large number of pores 2. There are no particular restrictions on diameter of the pores 2, but the diameters are preferably in the range of about 0.1 to 5 μm. The diameters of the pores 2 can be measured by SEM observation. The carbonaceous porous material 1 preferably has the porosity ε in the range of about 10 to 60%. Furthermnore, its specific surface area is preferably in the range of 50 to 500 $m^2/g$.

There are no particular restrictions on a material of the metal-containing particles 3, but there may be mentioned metal oxides, metal sulfides, metal nitrides, and so on. For example, the material can be a metal selected from the group consisting of Sn, Si, Al, Ge, Sb, Ag, Ga, In, Fe, Co, Ni, Ti, Mn, Ca, Ba, La, Zr, Ce, Cu, and Zn, or an alloy containing a metal selected from the group, or an oxide, sulfide, nitride, or the like of a metal or an alloy of a metal selected from the group.

It is preferable in the active material 5 of the present embodiment that a large number of metal-containing particles 3 gather to form an aggregate 4 in each pore 2.

Preferred diameters (primary particle diameter) of the metal-containing particles 3 are in the range of about 5 to 300 nm. Preferred diameters (secondary particle diameter) of aggregates 4 are in the range of about 100 to 5000 nm. The particle diameter can be measured by TEM or the like.

(Production Method of Anode Active Material)

First, a metal ion, a hydroxy acid, and a polyol are mixed.

There are no particular restrictions on the metal ion, but it can be, for example, an ion of at least one metal selected from the group consisting of Sn, Si, Al, Ge, Sb, Ag, Ga, In, Fe, Co, Ni, Ti, Mn, Ca, Ba, La, Zr, Ce, Cu, and Zn. Ions of these metals can be added in the form of various salts, e.g., metal chlorides such as $SnCl_2$, metal hydroxides such as $Al(OH)_3$, metal nitrates such as $Fe(NO_3)_3$, metal sulfates such as $FeSO_4$, and metal acetates such as $Sn(CH_3COO)_2$ and the like. Two or more types of metal ions can be used to prepare an alloy, an oxide of an alloy, or the like.

The hydroxy acid is an organic compound having a carboxyl group and a hydroxyl group, for example, there may be mentioned citric acid, tartaric acid, citramalic acid, isocitric acid, leucine acid, mevalonic acid, pantoic acid, ricinoleic acid, ricinelaidic acid, cerebronic acid, and so on. Two or more hydroxy acids may be used in combination.

The polyol is an organic compound having two or more hydroxyl groups, and can be one of glycols in which a hydroxyl group is bound to each of two carbon atoms of a chain aliphatic hydrocarbon or a cyclic aliphatic hydrocarbon, glycerin, and so on. The number of carbons in the polyol is preferably 1-4. Among the polyols, polyols particularly preferably applicable are ethylene glycol, propylene glycol, and diethylene glycol.

In the step of obtaining the polymer, first, a metal ion source such as a metal chloride is dissolved in a solution of the polyol containing the hydroxy acid, to form a hydroxy acid complex of the metal ion in the polyol. Subsequently, this solution is treated by heating or the like to cause dehydrating condensation (esterification) of the carboxyl group of the hydroxy acid and the hydroxyl groups of the polyol. This results in forming a network of hydroxy acid complexes by the polyol and obtaining, for example, a polymer in a gel form.

Since in this polymer the metal ion is held in a hydroxy complex, the metal ion is dispersed in the molecular level.

There are no particular restrictions on the heating temperature herein, but it is preferably in the range of 100 to 250° C.

Next, the polymer is thermally decomposed to be carbonized. There are no particular restrictions on carbonization conditions, but the polymer is thermally decomposed, for example, by heating at the temperature of about 300-1200° C. in an atmosphere such as a nitrogen atmosphere, an argon atmosphere, or vacuum with a low partial pressure of oxygen, to remove oxygen and hydrogen atoms from the polymer. At this time, oxygen atoms and hydrogen atoms are removed from the polymer to leave a carbonaceous material with pores, thereby forming a carbonaceous porous material. The metal ions held in the hydroxy complexes are reduced into the metal. At this time, a plurality of metal ions fuse together to form fine primary particles of the metal. It is normally often the case that these primary particles aggregate to form aggregates.

In cases where it is desirable to obtain metal oxide particles and aggregates thereof, the resultant is thereafter re-heated in an atmosphere containing oxygen. For obtaining a metal sulfide, an S source such as a sulfide ion is preliminarily added in the solution.

From the viewpoint of suppressing growth of primary particles, the temperature during the carbonization is preferably not more than the melting point of the metal or alloy.

The present embodiment involves the carbonization of the polymer in which the metal ion is dispersed in the molecular level, whereby the active material is obtained in the form in which fine metal-containing particles 3, e.g., with the particle diameter of about 10-300 in are supported in the carbonaceous porous material 1.

Since the particle diameter of the metal-containing particles 3 are sufficiently small in this active material 5, the diffusion of electrolyte ions such as lithium ions is adequately promoted and the rate performance is improved. The finer powdering with thermal expansion and constriction is also suppressed during charge-discharge cycles and the cycle performance is also improved. Since the metal-containing particles exist in the carbonaceous porous material, the active material exhibits satisfactory electron conductivity as a whole even with use of metal-containing particles having poor electron conductivity.

(Electrochemical Device)

Figure 2:
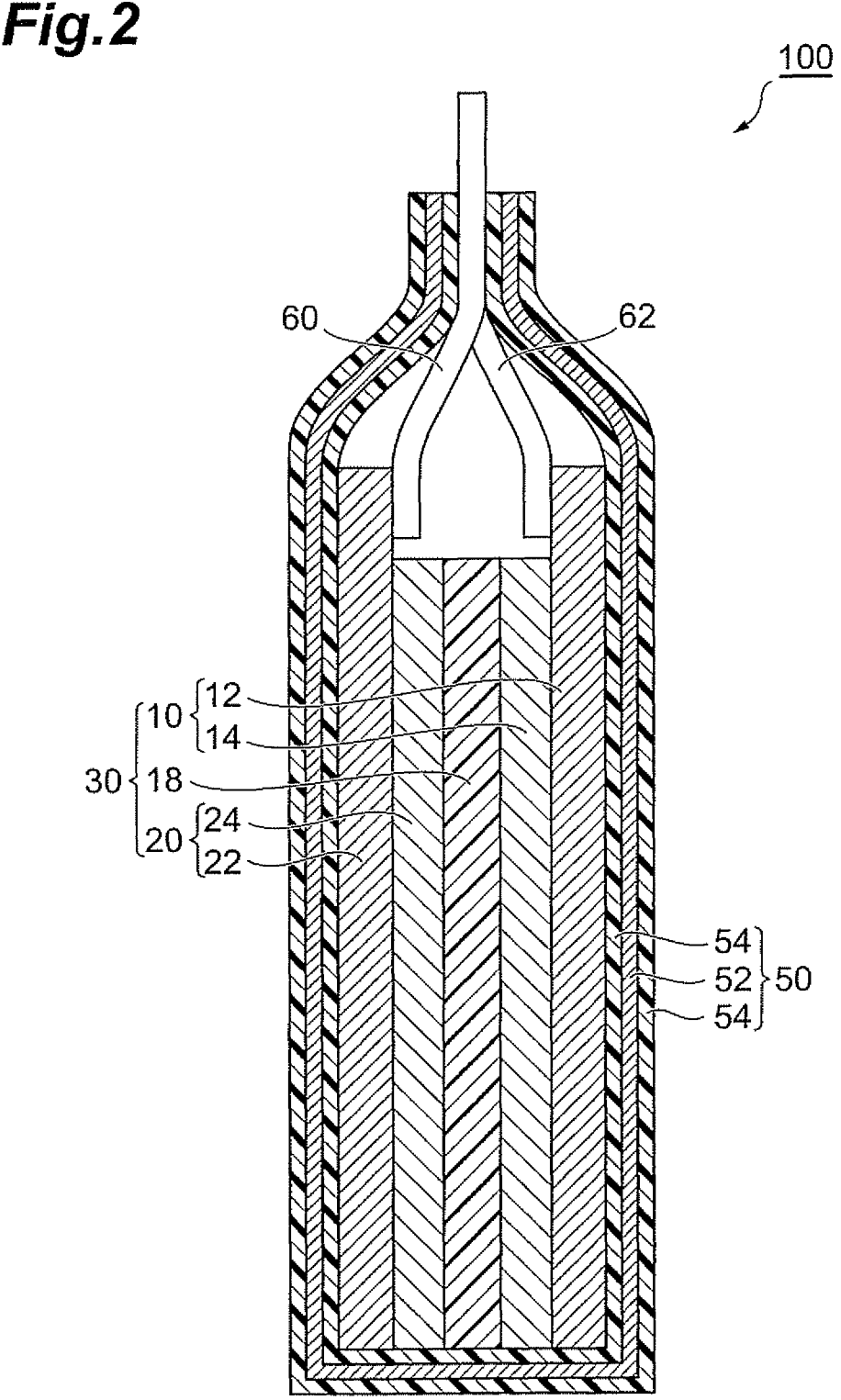
FIG. 2 is a schematic sectional view showing an electrochemical device according to an embodiment of the present invention.

The following will briefly describe a lithium-ion secondary battery as an electrochemical device using the active material of the present invention as an anode active material, with reference to FIG. 2.

The lithium-ion secondary battery 100 is composed mainly of a laminate 30, a case 50 housing the laminate 30 in a hermetically closed state, and a pair of leads 60, 62 connected to the laminate 30.

The laminate 30 has a structure in which a pair of cathode 10 and anode 20 are opposed to each other with a separator 18 in between. The cathode 10 is an electrode obtained by laying a cathode active material layer 14 on a cathode current collector 12. The anode 20 is an electrode obtained by laying an anode active material layer 24 on an anode current collector 22. The cathode active material layer 14 and the anode active material layer 24 are in contact with both sides of the separator 18. The leads 60, 62 are connected to respective ends of the cathode collector 12 and the anode collector 22, and the ends of the leads 60, 62 extend outward from the case 50.

(Anode)

The anode 20, as shown in FIG. 2, has the platelike (film-like) anode collector 22, and the anode active material layer 24 formed on the anode collector 22.

The anode collector 22 can be any electrically-conductive plate material and can be, for example, a metal thin film such as a foil of aluminum, copper, or nickel. The anode active material layer 24 mainly has the aforementioned active material 5, and a binder. The anode active material layer 24 may contain a conductive aid.

The binder binds active material particles together and also binds the active material to the anode collector 22.

A material of the binder can be any one capable of achieving the foregoing binding, and there may be mentioned, for example, fluorocarbon polymers such as polyvinylidene fluoride (PVDF), polytetrafluoroethylene (PTFE), a tetrafluoroethylene-hexafluoropropylene copolymer (FEP), a tetrafluoroethylene-perfluoroalkylvinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF).

Besides the above examples, the binder may be, for example, one of vinylidene fluoride-based fluororubbers such as vinylidene fluoride-hexafluoropropylene fluororubber (VDF-HFP fluororubber), vinylidene fluoride-hexafluoropropylene-tetrafluoroethylene fluororubber (VDF-BFP-TFE fluororubber), vinylidene fluoride-pentafluoropropylene fluororubber (VDF-PFP fluororubber), vinylidene fluoride-pentafluoropropylene-tetrafluoroethylene fluororubber (VDF-PFP-TFE fluororubber), vinylidene fluoride-perfluoromethylvinylether-tetrafluoroethylene fluororubber (VDF-PFMVE-TFE fluororubber), and vinylidene fluoride-chlorotrifluoroethylene fluororubber (VDF-CTFE fluororubber).

Furthermore, in addition to the above examples, the binder may also be, for example, one of polyethylene, polypropylene, polyethylene terephthalate, aromatic polyamide, cellulose, styrene-butadiene rubber, isoprene rubber, butadiene rubber, ethylene-propylene rubber and the like. The binder may also be one of thermoplastic elastomer polymers such as styrene-butadiene-styrene block copolymers and hydrogenated derivatives thereof, styrene-ethylene-butadiene-styrene copolymers, and styrene-isoprene-styrene block copolymers and hydrogenated derivatives thereof. Furthermore, the binder may be one of syndiotactic 1,2-polybutadiene, ethylene-vinyl acetate copolymers, and propylene-α-olefin (C2-C12 olefin) copolymers and the like.

The binder may also be one of electrically-conductive polymers with electron conductivity and electrically-conductive polymers with ion conductivity. An example of the electrically-conductive polymers with electron conductivity is polyacetylene. In this case, the binder also exhibits the function of conductive aid particles and therefore the conductive aid does not always have to be added.

The electrically-conductive polymers with ion conductivity applicable herein are, for example, those with ion conductivity of lithium ions and examples thereof include complexes of monomers of polymer compounds (polyether polymer compounds such as polyethylene oxide and polypropylene oxide, crosslinked polymers of polyether compounds, polyepichlorhydrin, polyphosphazine, polysiloxane, polyvinylpyrrolidone, polyvinylidene carbonate, polyacrylonitrile, etc.) with lithium salts such as $LiClO_4$, $LiBF_4$, $LiPF_6$, $LiAsF_6$, LiCl, LiBr, $Li(CF_3SO_2)_2N$, and $LiN(C_2F_5SO_2)_2$ or with alkali metal salts consisting mainly of lithium. A polymerization initiator used for making the complexes may be a photopolymerization initiator or a thermal polymerization initiator suitable for the selected one of the aforementioned monomers.

The content of the binder in the active material layer 24 is preferably 0.5 to 6% by mass, based on the mass of the active material layer. If the content of the binder is less than 0.5% by mass, there is an increasing tendency that the amount of the binder is too small to form a firm active material layer. If the content of the binder exceeds 6% by mass, there is an increasing tendency that it becomes difficult to achieve satisfactory volume energy density because of increase in the amount of the binder not contributing to electric capacity. In this case, if the binder has particularly low electron conductivity, there is an increasing tendency that the electric resistance of the active material layer increases, so as to fail in achieving sufficient electric capacity.

The conductive aid can be, for example, one of carbon blacks, carbon materials, fine powders of metals such as copper, nickel, stainless steel, and iron, mixtures of the carbon materials and fine metal powders, and electrically-conductive oxides such as ITO.

(Production Method of Anode)

The aforementioned active material and binder, and conductive aid in an amount according to need are added in a solvent to prepare a slurry. The solvent can be, for example, N-methyl-2-pyrrolidone, N,N-dimethylformamide, or the like. Then the slurry containing the active material, the binder, etc. is applied onto the surface of the anode collector 22, and dried.

(Cathode)

The cathode 10 has the platelike cathode current collector 12, and the cathode active material layer 14 formed on the cathode collector 12.

The cathode current collector 12, the binder, and the conductive aid can be the same as those for the anode, respectively. There are no particular restrictions on the cathode active material and the cathode active material can be any one of those for the well-known batteries. The cathode active material can be, for example, one selected from lithium cobaltate ($LiCoO_2$), lithium nickelate ($LiNiO_2$), lithium manganese spinel ($LiMn_2O_4$), and composite metal oxides represented by general formula: $LiNi_xMn_yCo_zO_2$ (x+y+z=1), lithium vanadium compounds ($LiV_2O_5$), olivine type $LiMPO_4$ (where M is Co, Ni, Mn, or Fe), lithium titanate ($Li_4Ti_5O_{12}$), and so on.

(Electrolyte Solution)

The electrolyte solution is contained inside the cathode active material layer 14, anode active material layer 24, and separator 18. There are no particular restrictions on the electrolyte solution, and the electrolyte solution can be, for example, one containing a lithium salt (an aqueous electrolyte solution, or an electrolyte solution using an organic solvent) in the present embodiment. However, the aqueous electrolyte solution has a low electrochemical decomposition voltage and therefore the withstanding voltage in charging is limited to a low level; therefore, it is preferable to adopt an electrolyte solution using an organic solvent (i.e., a nonaqueous electrolyte solution). The electrolyte solution preferably used herein is a nonaqueous electrolyte solution in which a lithium salt is dissolved in a nonaqueous solvent (an organic solvent). The lithium salt used herein can be, for example, one of salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. These salts may be used singly or in combination of two or more.

Examples of organic solvents preferably applicable include propylene carbonate, ethylene carbonate, and diethylcarbonate. These may be used singly or as a mixture of two or more at any ratio.

In the present embodiment, the electrolyte solution does not always have to be the liquid electrolyte but it may also be a gel electrolyte obtained by adding a gelatinizing agent in the solution. The electrolyte solution may be replaced by a solid electrolyte (a solid polymer electrolyte or an electrolyte consisting of an ion-conductive inorganic material).

The separator 18 is an electrically insulating porous material and can be, for example, one of monolayer and multilayer bodies of films of polyethylene, polypropylene, or polyolefin, stretched films of mixtures of the foregoing polymers, or nonwoven fabric of fiber consisting of at least one constituent material selected from the group consisting of cellulose, polyester, and polypropylene.

The case 50 hermetically houses the laminate 30 and the electrolyte solution inside. There are no particular restrictions on the case 50 as long as it is one that can suppress leakage of the electrolyte solution to the outside, and intrusion or the like of water and others from the outside to the interior of the electrochemical device 100. For example, the case 50 can be a metal laminate film obtained by coating a metal foil 52 with polymer films 54 on both sides, as shown in FIG. 2. The metal foil 52 can be, for example, an aluminum foil and the polymer films 54 can be films of polypropylene or the like. For example, a material of the outside polymer film 54 is preferably a polymer with a high melting point, e.g., polyethylene terephthalate (PET) or polyamide, and a material of the inside polymer film 54 is preferably polyethylene, polypropylene, or the like.

The leads 60, 62 are made of an electrically conductive material such as aluminum.

By the well-known methods, the leads 62, 60 are welded to the cathode collector 12 and to the anode collector 22, respectively, the resultant, together with the electrolyte solution, is put into the case 50 in a state in which the separator 18 is interposed between the cathode active material layer 14 of the cathode 10 and the anode active material layer 24 of the anode 20, and the entrance of the case 50 is sealed.

The present invention is not limited to the above embodiments but can be modified in many ways. For example, the aforementioned active material 5 and the electrode containing the active material 5 are also applicable to electrodes of electric double-layer capacitors, as well as the lithium-ion secondary batteries.

EXAMPLE 1

Figure 3:
FIG. 3 is an SEM photograph of a cross section of an anode active material in Example 1.

Tin chloride and iron sulfate were weighed at the ratio of Sn:Fe=1:1 (molar ratio) and 5 moles of citric acid and 20 moles of ethylene glycol were added relative to a total of 1 mole of Sn and Fe into the mixture. This mixture solution was stirred at 50° C. for 5 hours, thereafter polymerized at 140° C. under stirring for one hour, and further fired at 750° C. in an Ar atmosphere for one hour to obtain an anode active material. FIG. 3 shows an SEM photograph of a cross section of the resulting anode active material. The specific surface area of the anode active material was 251 m$^2$/g. The primary particle diameter of the alloy particles were approximately 200 nm.

The anode active material thus obtained was pulverized, then 90% by weight of the anode active material and 10% by weight of polyvinylidene fluoride (PVdF) were mixed therein, and N-methylpyrrolidone (NMP) was added thereinto to obtain a slurry. This slurry was then applied onto a copper foil as a current collector by a doctor blade and dried, and the resultant was rolled to produce an anode.

92% by weight of Li(Ni$_{1/3}$Co$_{1/3}$Mn$_{1/3}$)O$_2$, 2% by weight of acetylene black, 3% by weight of graphite, and 3% by weight of PVdF were mixed and NMP was added to obtain a slurry. Then, just as in the case of the anode, the slurry was applied onto an aluminum foil as a current collector, and dried, and the resultant was rolled to produce a cathode.

The anode and cathode thus produced were cut by punching and a polyethylene separator was interposed between them to obtain a laminate, thereby fabricating a cell. A nickel lead was attached to the current collector of the anode and an aluminum lead to the current collector of the cathode. This cell was put into an armor of aluminum laminate film and its opening was sealed by heat lamination while leaving a portion of the opening. The electrolyte solution prepared was 1.5M LiPF$_6$/PC+EC+DEC(2:1:7)+3% by weight of vinylene carbonate, and was poured through the opening into the interior, and the laminate film was vacuum-sealed to fabricate a battery.

COMPARATIVE EXAMPLE 1

An alloy of Sn:Fe=1:1 was prepared by arc melting. This alloy was thermally treated at 750° C. for 24 hours, and then pulverized with a mixer mill to obtain alloy particles with the average particle diameter of 4 μm. Using the particles as an anode active material, an electrode was produced in the same manner as in Example 1, and a battery was fabricated using it.

COMPARATIVE EXAMPLE 2

1 g of tin phthalocyanine and 10 g of phenol resin were mixed and the mixture was fired at 600° C. in an argon atmosphere. The fired body obtained was used as an anode active material and a battery was fabricated in the same manner as in Example 1.

(High Rate Discharge Performance Evaluation Test)

The high rate discharge performance was evaluated based on a ratio (A5C/A1C) of discharge capacity (A5C) in 5C constant-current discharge to discharge capacity (A1C) in 1C constant-current discharge, at 25° C.

(Charge-Discharge Cycle Performance Evaluation Test)

A lithium-ion secondary battery was fabricated and then discharge capacity A2 thereof was measured after 300 charge and discharge cycles at 25° C. The charge-discharge cycle performance was evaluated based on a ratio {100×(A2/A1)} [%] of discharge capacity A2 to discharge capacity A1 after the first charge and discharge cycle. The charge was constant-current constant-voltage charge at 1 C to 4.2 V and the discharge was constant-current discharge at 1 C to 2.5 V.

The results are presented in FIG. 4. It is seen that the battery in Example has the improved cycle performance and rate performance as compared with the comparative examples. These effects are believed to result from the fact that the metal material was more nanoparticulated than in the comparative examples and well dispersed in carbon. In Comparative Example 2, the polymer carbonized was one in which ligands of the metal complex were not directly chemically bonded to the resin, and it is thus considered that the metal was easy to move and that metal particles were relatively larger than in the example.

What is claimed is:

1. An electrode for a lithium ion secondary battery comprising:
   a collector; and
   an active material layer formed on the collector, the active material layer comprising a binder and active material particles, wherein:
the active material particles comprise:
- a carbonaceous porous material having a specific surface area in a range of 50 to 500 $m^2/g$; and
- an aggregate of metal-containing particles supported in a pore of the carbonaceous porous material, the metal-containing particles have a primary diameter in a range of 10 to 300 nm, the metal-containing particles contain at least one metal selected from the group consisting of Sn, Ge, Sb, Ga, In, La, and Ce, a pore diameter of the carbonaceous porous material is 0.1 to 5 μm, and the aggregate of the metal-containing particle has a secondary diameter in a range of 100 to 5000 nm.

2. An electrochemical device comprising the electrode of claim 1.

3. The electrode according to claim 1, wherein the active material layer further comprises an electrolyte solution containing a lithium salt.

* * * * *